(12) United States Patent
Vaideeswaran et al.

(10) Patent No.: US 8,721,823 B2
(45) Date of Patent: May 13, 2014

(54) METHOD OF FORMING LARGE DIAMETER THERMOPLASTIC SEAL

(75) Inventors: Karthik Vaideeswaran, Redondo Beach, CA (US); Jose R. Sousa, East Providence, RI (US); Hamid Reza Ghalambor, Irvine, CA (US); Sarah L. Clark, Somerville, MA (US); Ceyhan Celik, Dracut, MA (US); Gary Charles Hildreth, Jr., North Oxford, MA (US); Helina Joshi, Shrewsbury, MA (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 656 days.

(21) Appl. No.: 12/614,191

(22) Filed: Nov. 6, 2009

(65) Prior Publication Data

US 2010/0116422 A1 May 13, 2010

Related U.S. Application Data

(60) Provisional application No. 61/112,421, filed on Nov. 7, 2008, provisional application No. 61/116,901, filed on Nov. 21, 2008, provisional application No. 61/166,543, filed on Apr. 3, 2009.

(51) Int. Cl.
*B29C 53/36* (2006.01)
*B29C 65/00* (2006.01)
*B29C 65/18* (2006.01)

(52) U.S. Cl.
CPC ........... *B29C 66/1142* (2013.01); *B29C 66/034* (2013.01); *B29C 66/0242* (2013.01); *B29C 53/36* (2013.01); *B29C 65/18* (2013.01)
USPC ...................... 156/217; 156/304.6; 156/308.4

(58) Field of Classification Search
CPC .............. B29C 66/1142; B29C 66/034; B29C 66/0242; B29C 53/36; B29C 65/18
USPC ................. 156/217, 218, 304.6, 308.2, 308.4
See application file for complete search history.

(56) References Cited

U.S. PATENT DOCUMENTS

| | | |
|---|---|---|
| 3,891,490 A | 6/1975 | Humphries |
| 3,897,296 A | 7/1975 | Waldrum |

(Continued)

FOREIGN PATENT DOCUMENTS

| | | |
|---|---|---|
| CN | 2037413 U | 5/1989 |
| CN | 1317020 A | 10/2001 |

(Continued)

OTHER PUBLICATIONS http://web.archive.org/web/20071014021420/http://www.boedeker.com/anneal.htm, captured Oct. 14, 2007.*

(Continued)

*Primary Examiner* — Christopher Schatz
*Assistant Examiner* — John Blades
(74) *Attorney, Agent, or Firm* — Abel Law Group, LLP; Chi Suk Kim

(57) ABSTRACT

A method of forming a seal ring includes heating an extruded rod to a temperature above a glass transition temperature. The extruded rod has first and second ends. The method further includes bending the extruded rod into a circular structure while the temperature is above the glass transition temperature, joining the first and second ends of the extruded rod to form a semi-finished ring, and annealing the semi-finished ring.

19 Claims, 6 Drawing Sheets

(56) References Cited

U.S. PATENT DOCUMENTS

| | | | |
|---|---|---|---|
| 3,994,767 A * | 11/1976 | Smith | 156/217 |
| 4,110,150 A | 8/1978 | Ostrowski et al. | |
| 4,157,274 A | 6/1979 | Johnson, III et al. | |
| 4,189,340 A | 2/1980 | Newkirk | |
| 4,207,135 A * | 6/1980 | Pavano | 156/502 |
| 4,239,574 A | 12/1980 | Aust et al. | |
| 4,352,977 A | 10/1982 | Hardigg et al. | |
| 4,369,779 A | 1/1983 | Spencer | |
| 4,412,835 A | 11/1983 | Spencer | |
| 4,521,263 A | 6/1985 | Benin et al. | |
| 4,610,670 A | 9/1986 | Spencer | |
| 4,752,350 A | 6/1988 | Schuster | |
| 4,752,512 A | 6/1988 | Wolff | |
| 4,753,697 A | 6/1988 | Shaposka et al. | |
| 4,781,787 A | 11/1988 | Weissfloch et al. | |
| 4,867,835 A | 9/1989 | Poole | |
| 4,925,519 A | 5/1990 | Newkirk et al. | |
| 4,927,642 A | 5/1990 | Kunz | |
| 4,963,219 A | 10/1990 | Nichols et al. | |
| 4,978,408 A | 12/1990 | Burford et al. | |
| 4,995,935 A | 2/1991 | Ganzberger | |
| 5,006,198 A | 4/1991 | Pasquini | |
| 5,142,117 A | 8/1992 | Hoggatt et al. | |
| 5,183,860 A | 2/1993 | Kashihara | |
| 5,229,562 A | 7/1993 | Burnett et al. | |
| 5,338,611 A | 8/1994 | Lause et al. | |
| 5,370,761 A | 12/1994 | Chitouras | |
| 5,460,674 A | 10/1995 | Chitouras | |
| 5,462,706 A | 10/1995 | McMillan et al. | |
| 5,472,334 A | 12/1995 | Takahashi | |
| 5,486,648 A | 1/1996 | Chan et al. | |
| 5,486,684 A | 1/1996 | Peterson et al. | |
| 5,500,511 A | 3/1996 | Hansen et al. | |
| 5,591,292 A | 1/1997 | Blomqvist | |
| 5,665,825 A | 9/1997 | Davies et al. | |
| 5,717,191 A | 2/1998 | Christensen et al. | |
| 5,770,006 A | 6/1998 | Andrew et al. | |
| 5,793,017 A | 8/1998 | Yamada et al. | |
| 5,799,953 A | 9/1998 | Henderson | |
| 5,834,081 A | 11/1998 | Fanti | |
| 5,837,095 A | 11/1998 | Bruchu et al. | |
| 5,855,720 A | 1/1999 | Johnson et al. | |
| 5,865,443 A | 2/1999 | Abe | |
| 5,869,814 A | 2/1999 | Scoles | |
| 5,876,541 A | 3/1999 | Chitouras | |
| 5,879,789 A | 3/1999 | Dolan et al. | |
| 5,902,447 A | 5/1999 | Johnson et al. | |
| 5,921,587 A | 7/1999 | Lueghamer | |
| 5,985,949 A | 11/1999 | Seguchi et al. | |
| 6,123,891 A | 9/2000 | De Tonnac | |
| 6,204,301 B1 | 3/2001 | Oshima et al. | |
| 6,284,089 B1 | 9/2001 | Anderson et al. | |
| 6,297,478 B1 | 10/2001 | Kano et al. | |
| 6,313,440 B1 | 11/2001 | Weber et al. | |
| 6,326,099 B1 | 12/2001 | Schubert | |
| 6,340,718 B1 | 1/2002 | Korenev et al. | |
| 6,444,946 B1 | 9/2002 | Korte | |
| 6,465,575 B1 | 10/2002 | Kusano et al. | |
| 6,488,793 B2 | 12/2002 | Natrop et al. | |
| 6,488,802 B1 | 12/2002 | Levingston et al. | |
| 6,490,839 B1 | 12/2002 | Macquart et al. | |
| 6,531,559 B1 | 3/2003 | Smith et al. | |
| 6,552,099 B2 | 4/2003 | Yamamoto et al. | |
| 6,565,942 B2 | 5/2003 | Anderson et al. | |
| 6,596,110 B1 | 7/2003 | Chitouras | |
| 6,709,457 B1 | 3/2004 | Otte et al. | |
| 6,737,165 B1 | 5/2004 | Smith et al. | |
| 6,787,221 B2 | 9/2004 | Botrie et al. | |
| 6,811,632 B2 | 11/2004 | Nelson et al. | |
| 6,884,827 B2 | 4/2005 | Ota et al. | |
| 6,918,986 B2 | 7/2005 | Cupp | |
| 7,175,725 B2 | 2/2007 | Chitouras | |
| 7,314,646 B2 | 1/2008 | Sawyer et al. | |
| 7,563,050 B2 | 7/2009 | Strait | |
| 7,754,322 B2 | 7/2010 | Tilbrook et al. | |
| 7,923,102 B2 | 4/2011 | Tilbrook et al. | |
| 2002/0038687 A1 | 4/2002 | Anderson et al. | |
| 2002/0132947 A1 | 9/2002 | Smith et al. | |
| 2002/0158424 A1 | 10/2002 | Yanagiguchi et al. | |
| 2002/0169237 A1 | 11/2002 | Ono et al. | |
| 2003/0001307 A1 | 1/2003 | Miller | |
| 2003/0122318 A1 | 7/2003 | Yanagiguchi et al. | |
| 2004/0082701 A1 | 4/2004 | Ota et al. | |
| 2004/0143069 A1 | 7/2004 | Matsuoka et al. | |
| 2004/0232624 A1* | 11/2004 | Hisano et al. | 277/500 |
| 2004/0251634 A1 | 12/2004 | Shimazu et al. | |
| 2005/0230859 A1 | 10/2005 | Hamaguchi et al. | |
| 2006/0029795 A1 | 2/2006 | Sawyer et al. | |
| 2006/0135692 A1 | 6/2006 | Shibata et al. | |
| 2007/0023129 A1 | 2/2007 | Stieler et al. | |
| 2007/0066739 A1 | 3/2007 | Odle et al. | |
| 2007/0148389 A1 | 6/2007 | Nishioka et al. | |
| 2008/0038144 A1 | 2/2008 | Maziasz et al. | |
| 2009/0163955 A1 | 6/2009 | Moumene et al. | |
| 2010/0117310 A1 | 5/2010 | Celik et al. | |

FOREIGN PATENT DOCUMENTS

| | | | |
|---|---|---|---|
| CN | 1338123 A | 2/2002 | |
| CN | 1379850 A | 11/2002 | |
| CN | 1418241 A | 5/2003 | |
| CN | 1865384 A | 11/2006 | |
| EP | 0332939 A2 | 9/1989 | |
| GB | 0758447 | 10/1956 | |
| GB | 1293906 | 10/1972 | |
| JP | 61-022248 U | 2/1986 | |
| JP | 62-189137 A | 8/1987 | |
| JP | 63-163071 A | 7/1988 | |
| JP | S63-280967 A | 11/1988 | |
| JP | H1-193330 A | 8/1989 | |
| JP | H02-134471 A | 5/1990 | |
| JP | H07-232394 A | 9/1995 | |
| JP | 10318375 A | 12/1998 | |
| JP | H11-005965 A | 1/1999 | |
| JP | 2000327903 A | 11/2000 | |
| JP | 2001004032 A | 1/2001 | |
| JP | 2004-018614 A | 1/2004 | |
| JP | 2004-108522 A | 4/2004 | |
| JP | 2004-217888 A | 8/2004 | |
| JP | 2004-291609 A | 10/2004 | |
| JP | 2005-178105 A | 7/2005 | |
| JP | 2005-188710 A | 7/2005 | |
| JP | 2005-307090 A | 11/2005 | |
| JP | 2007-173420 A | 7/2007 | | |
| NL | 0 414 298 | * | 2/1991 | B29D 31/00 |
| WO | 9803286 A1 | 1/1998 | |
| WO | 01-90274 A1 | 11/2001 | |
| WO | 2004/111125 A1 | 12/2004 | |
| WO | 2010054241 A2 | 5/2010 | |
| WO | 2010054243 A2 | 5/2010 | |
| WO | 2013/177403 A1 | 11/2013 | |

OTHER PUBLICATIONS

Search Results, Received Jul. 31, 2007, 13 pages.
Practical Encyclopedia of Plastics. Sep. 10, 1989, Revised Edition, vol. 3, p. 535.
Hague, A. et al., Sensitivity of the Acoustic Impact Technique in Characterizing Defects/Damage in Laminated Composites, Journal of Reinforced Plastics and Composites, 1995, vol. 14, No. 3, pp. 280-296.
Encyclopedia of Polymers, Moscow, 1974, vol. 3, col. 623. Partial English language summary attached.
B.L. Gregory et al., Deformation Behaviour of coextruded multilayer composites with polycarbonate and poly(styrene-acrylonitrile), Journal of Materials Science, 1987, vol. 22, p. 532-538.
International Search Report for PCT/US2009/063615 dated Jul. 27, 2010, 5 pgs.
International Search Report for PCT/US2009/063613 dated May 13, 2010, 3 pgs.
U.S. Appl. No. 61/166,543, filed Apr. 3, 2009, Inventors: Karthik Vaideeswaran et al.

(56) References Cited

OTHER PUBLICATIONS

U.S. Appl. No. 12/614,205, filed Nov. 6, 2009, Inventors: Ceyhan Celik et al.
U.S. Appl. No. 61/244,361, filed Sep. 21, 2009, Inventors: Karthik Vaideeswaran et al.
U.S. Appl. No. 61/650,962, filed May 23, 2012, Inventors: Yuxiang Liu et al.
Materials science and engineering manual, Jan. 31, 2004, Chang-xu Shi, Chemical Industry Press, pp. 8-46.
Membrane chemistry and technology, Dec. 31, 2003, Tong-wen Xu, University of science and technology of China press, p. 38.
International Search Report for PCT/US2013/042435 dated Aug. 27, 2013, 1 page.
"Jitsuyo Plastic Yougo Jiten," Sep. 10, 1989, 6 pages.

\* cited by examiner

METHOD OF FORMING LARGE DIAMETER THERMOPLASTIC SEAL

CROSS REFERENCE TO RELATED APPLICATION(S)

The present application claims priority from U.S. Provisional Patent Application No. 61/112,421, filed Nov. 7, 2008, entitled "METHOD OF FORMING LARGE DIAMETER THERMOPLASTIC SEAL," naming inventors Sarah L. Clark, Ceyhan Celik, Gary Charles Hildreth, Jr., and Helina Joshi, U.S. Provisional Patent Application No. 61/116,901, filed Nov. 21, 2008, entitled "METHOD OF FORMING LARGE DIAMETER THERMOPLASTIC SEAL," naming inventors Sarah L. Clark, Ceyhan Celik, Gary Charles Hildreth, Jr., and Helina Joshi, and U.S. Provisional Patent Application No. 61/166,543, filed Apr. 3, 2009, entitled "METHOD OF FORMING LARGE DIAMETER THERMOPLASTIC SEAL," naming inventors Karthik Vaideeswaran, Jose R. Sousa, Hamid Reza Ghalambor, and Sarah L. Clark, which applications are incorporated by reference herein in its entirety.

FIELD OF THE DISCLOSURE

This disclosure, in general, relates to thermoplastic seals, and in particular to large diameter thermoplastic seals.

BACKGROUND

Various industries are increasingly turning to large-scale equipment to meet operational demands. As industry develops large-scale equipment, it seeks large-scale components, such as seals and o-rings. Often, the large-scale equipment is located in remote harsh environments, increasing demand for durable and hardy seals. For example, as the oil and gas industry seeks to drill in deeper water, the scale of the equipment used is increasing and, as a result, the demand for more durable, large-scale products that can survive harsh environments increases. However, conventional methods for forming thermoplastic seals do not produce large diameter seals having desirable mechanical properties.

One conventional method includes compression molding. Conventional compression molded seals have poor mechanical properties, such as low elongation-at-break. As a result, seals formed through such conventional compression molding techniques tend to have a low durability and poor performance.

Other conventional techniques limit the size of the seals that can be made and tend to produce a significant amount of waste. For example, circular seals may be cut from an extruded sheet of thermoplastic material, leaving a significant amount of waste material. In addition, the size of the seals is limited by the width of the sheet of thermoplastic material.

As such, a new method of forming a seal would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWINGS

In a particular embodiment, a method for forming a seal ring includes heating an extruded rod, bending the extruded rod, joining the ends of the extruded rod to form a semi-finished ring, and annealing the semi-finished ring. The semi-finished ring may be machined or further processed to form a seal ring, back-up ring, or other seal device, collectively referred to as seal rings herein. In an example, joining the ends of the extruded rod includes welding the ends of the extruded rod by melting the ends and pressing the ends together. In particular, heating the extruded rods includes heating the rods to a temperature greater than the glass transition temperature. For example, the extruded rods may be heated to a heat index in a range of 0.65 to 0.999. In a further example, the semi-finished ring is annealed at a temperature greater than a glass transition temperature for a period of at least two hours.

In another exemplary embodiment, a seal ring includes an extruded thermoplastic material having a weld elongation-at-break of at least 5% as per ASTM D638 testing specification. The seal ring has a circumference of at least 1.5 meters. For example, the seal ring may have a diameter of at least 1.3 meters. In an example, the seal ring includes at least one weld. In a particular example, the extruded thermoplastic material includes a thermoplastic material having a glass transition temperature greater than 100° C. In a further example, the extruded thermoplastic material has a coefficient of friction of not greater than 0.45. In addition, the thermoplastic material may have a tensile strength at yield of at least 3100 psi (21.4 MPa).

Figure 1:
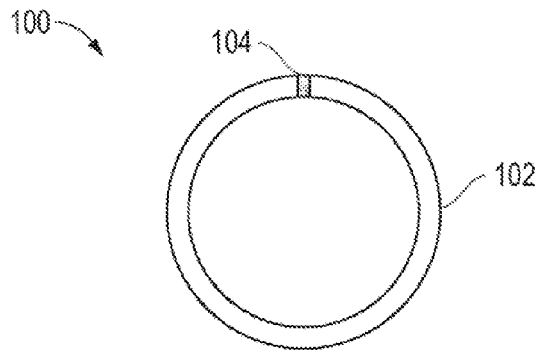
FIG. 1 and FIG. 2 include illustrations of exemplary seals.

As illustrated in FIG. 1, a seal ring 100 may include a thermoplastic rod 102. In an example, the thermoplastic rod is an extruded thermoplastic rod, such as a melt extruded rod. In particular, the extruded thermoplastic rod is not paste extruded. Alternatively, the rod 102 may be a compression molded rod. The ends of the thermoplastic rod 102 may be joined at a weld 104. In another embodiment illustrated in FIG. 2, a seal ring 200 may include thermoplastic rods 202 and 204. The thermoplastic rods 202 and 204 may be joined at their ends at welds 206 and 208. While the methods described herein are generally described in relation to seal rings formed from a single bent rod, the methods can be extended to seal rings formed from more than one thermoplastic rod, for example, 2, 3, 4, or more extruded rods.

Figure 3:
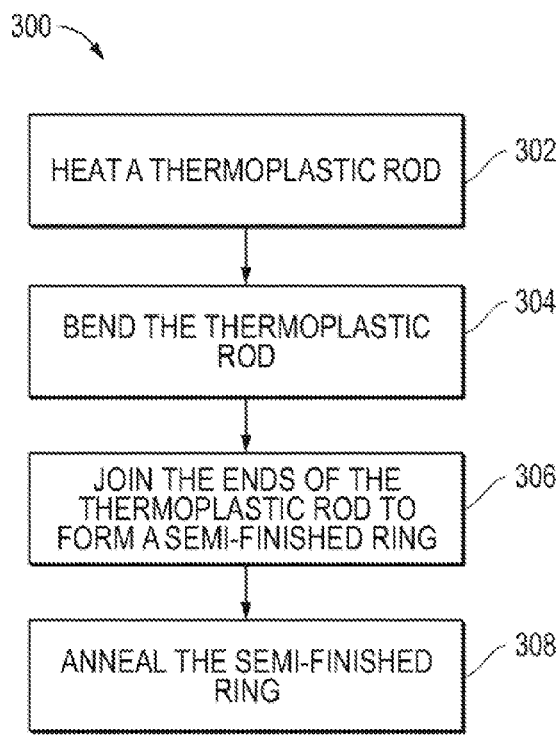
FIG. 3 and FIG. 4 include block diagrams of exemplary methods for forming seals.

FIG. 3 includes an illustration of an exemplary method 300 for forming a seal ring. The method includes heating an extruded thermoplastic rod, as illustrated at 302. Alternatively, the rod may be a compression molded rod. The thermoplastic rod may be formed of a thermoplastic material, such as an engineering or high performance thermoplastic polymer. For example, the thermoplastic material may include a polymer, such as a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, a liquid crystal polymer, or any combination thereof. In an example, the thermoplastic material includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the thermoplastic material includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the thermoplastic material includes polyketone, such as polyether ether ketone (PEEK), polyether ketone, polyether ketone ketone, polyether ketone ether ketone ketone, a derivative thereof, or a combination thereof. An example thermoplastic fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof. An exemplary liquid crystal polymer includes aromatic polyester polymers, such as those available under tradenames XYDAR® (Amoco), VECTRA® (Hoechst Celanese), SUMIKOSUPER™ or EKONOL™ (Sumitomo Chemical), DuPont HX™ or DuPont ZENITE™ (E.I. DuPont de Nemours), RODRUN™ (Unitika), GRANLAR™ (Grandmont), or any combination thereof. In an additional example, the thermoplastic polymer may be ultra high molecular weight polyethylene. Ultra high molecular weight polyethylene may be used in this process even though its glass transition temperature is approximately −160° C.

The thermoplastic material may also include a filler, such as a solid lubricant, a ceramic or mineral filler, a polymer filler, a fiber filler, a metal particulate filler or salts or any combination thereof. An exemplary solid lubricant includes polytetrafluoroethylene, molybdenum disulfide, tungsten disulfide, graphite, graphene, expanded graphite, boron nitride, talc, calcium fluoride, cerium fluoride, or any combination thereof. An exemplary ceramic or mineral includes alumina, silica, titanium dioxide, calcium fluoride, boron nitride, mica, Wollastonite, silicon carbide, silicon nitride, zirconia, carbon black, pigments, or any combination thereof. An exemplary polymer filler includes polyimide, liquid crystal polymers such as Ekonol® polyester, polybenzimidazole, polytetrafluoroethylene, any of the thermoplastic polymers listed above, or any combination thereof. An exemplary fiber includes nylon fibers, glass fibers, carbon fibers, polyacrylonitrile fibers, polyaramid fibers, polytetrafluoroethylene fibers, basalt fibers, graphite fibers, ceramic fibers, or any combination thereof. Exemplary metals include bronze, copper, stainless steel, or any combination thereof. An exemplary salt includes a sulfate, a sulfide, a phosphate, or any combination thereof.

In an exemplary embodiment, the rod may be formed of an extruded composite material. For example, the composite material may be formed of a thermoplastic material matrix and a filler. In a particular example, the filler is a solid lubricant. In another example, the filler includes a fluoropolymer. In a further example, the filler includes a combination of solid lubricant and fluoropolymer. In an embodiment, the composite material includes a polyketone matrix, such as PEEK, and includes a solid lubricant filler. In another exemplary embodiment, the composite material includes a polyketone matrix, such as PEEK, and includes a carbon filler which may be selected from graphite, carbon black, carbon fiber or any combination thereof.

Figure 8:
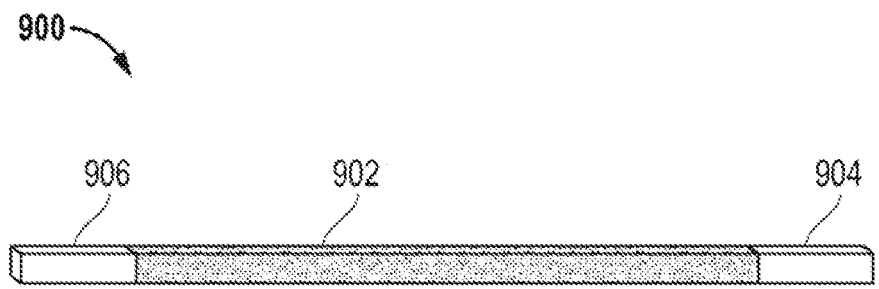
FIG. 8 includes an illustration of an exemplary thermoplastic rod.
Figure 9:
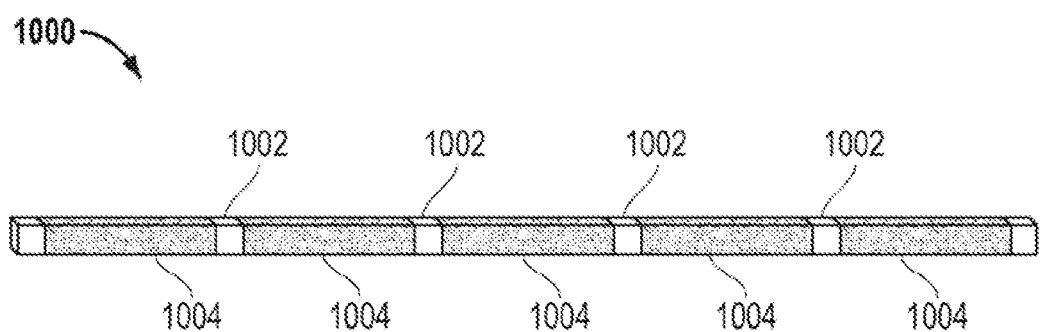
FIG. 9 includes an illustration of an exemplary extruded material.

In a further embodiment, the rod may be partially formed of a composite and partially formed of an unfilled material. As illustrated in FIG. 8, a rod 900 may include a center portion 902 formed of a composite material and may include end portions 904 and 906 formed of unfilled polymer. For example, the center portion 902 may be a filled polymer, such as a PTFE filled PEEK material, and the end portions 904 and 906 may be formed of a unfilled polymer, such as neat PEEK. In a particular embodiment, a rod, such as the rod 900 of FIG. 8, may be formed from an extruded material having a composition that changes along a longitudinal axis. For example, FIG. 9 includes an illustration of an extruded material 1000 that includes composite portions 1002 and unfilled portions 1004. In an example, the extruded material 1000 may be cut at the unfilled portions 1004 to form a rod, such as the rod 900 of FIG. 8. In a particular example, the extruded material 1000 may be formed by extruding two materials through a single die and varying the rate of extrusion of the two materials in an opposite manner.

In an example, heating the extruded rod includes heating the extruded rod to a temperature greater than the glass transition temperature of the thermoplastic material of the rod. In particular, the thermoplastic rod may be heated to a temperature greater than the glass transition temperature, but less than the melting point of the thermoplastic material. For example, the extruded thermoplastic rod may be heated to a heat index in a range of 0.60 to 0.999. The heat index is a ratio of the temperature to which a material is heated divided by the melting point. In a further example, the heat index may be in a range of 0.70 to 0.999, such as a range of 0.8 to 0.999, or even a range of 0.9 to 0.99.

In an example, the thermoplastic material has a melting point of at least 250° C. For example, the thermoplastic material may have a melting point of at least 300° C., such as at least 320° C. Further, the thermoplastic material may have a glass transition temperature of at least 100° C., such as at least 125° C., or even at least 145° C. The exception to this is ultra high molecular weight polyethylene which has a glass transition temperature of −160° C. and a melt point of 135° C.

Figure 5:
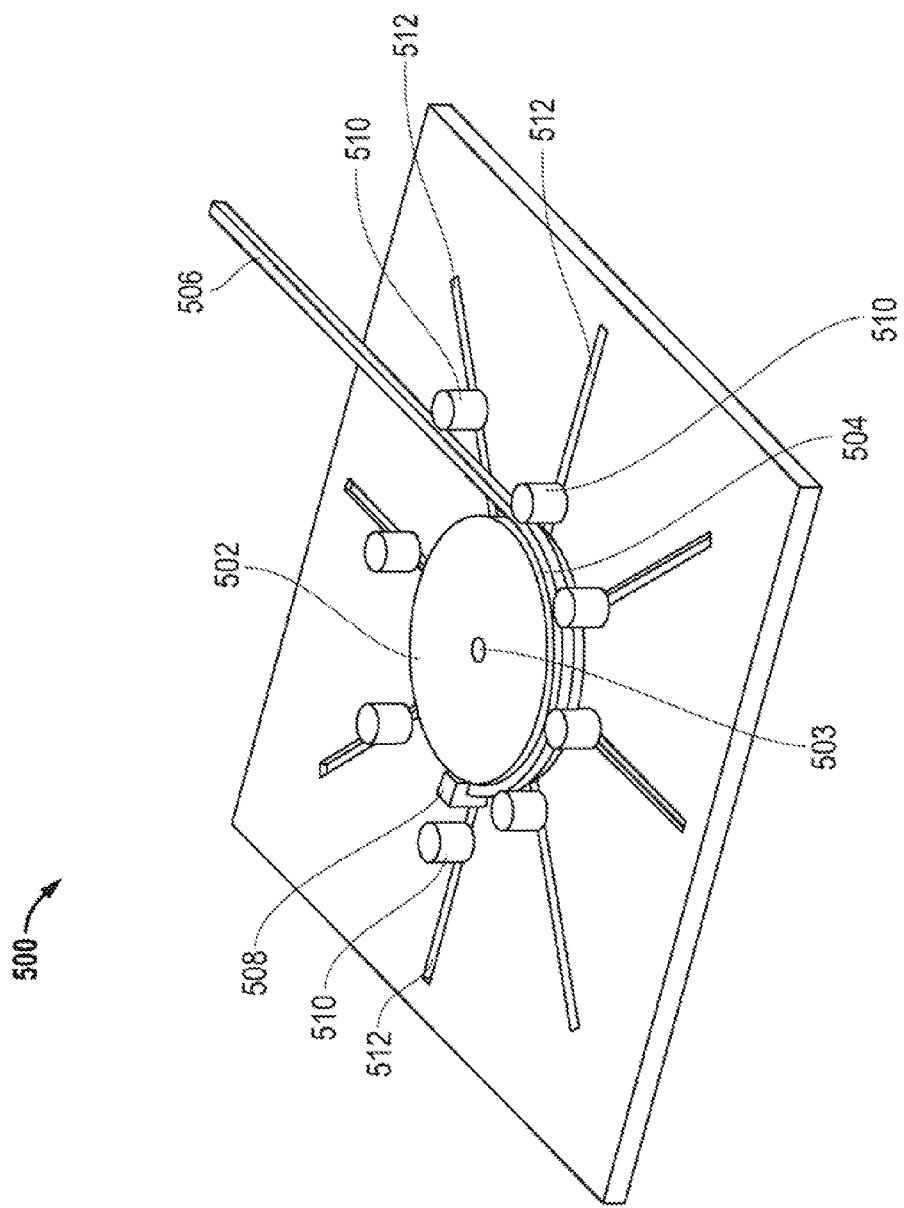
FIG. 5 includes an illustration of a forming device.

Returning to FIG. 3, once heated, the extruded thermoplastic rod is bent, as illustrated at 304. For example, while the thermoplastic rod is at a temperature greater than the glass transition temperature, the rod may be bent to a desired shape. In an example, the rod may be applied between a three-roller system. In another example, the rod may be bent and placed into a mold. In a further example, the rod may be clamped to a circular mold and bent through the rotation of the mold. An exemplary mechanism for bending the thermoplastic rod is illustrated in FIG. 5, described in more detail below.

In a particular example, the rod is a straight rod. Further, the rod may have a cross-section, such as a circular cross-section or a polygonal cross-section. In an example, the cross-section is a polygonal cross-section, such as a polygon with at least four sides. In particular, the polygon may be a rectangle or square. As an alternative to heating and bending, an extruded rod may be extruded in the form of an arc and the ends of the arc joined to form the sealing device. In another alternative, arcs may be cut from sheets of material, such as extruded sheets or compression molded sheets, and the ends of the arcs joined.

Once bent, the ends of the rod are joined, as illustrated at 306 of FIG. 3. For example, the first and second ends of a rod may be joined together. In another example, the ends of the rod may be joined to the respective ends of another rod or other rods. The ends of the rod may be joined through hot melt welding, injection molding, adhesive, ultrasonic welding, or any combination thereof. In a particular example, the ends of the rod are joined through hot melt welding. For example, the hot melt welding may include applying a heat source to the ends of the rod to melt portions of the rod proximal to the ends and once melted, pressing the ends together. In such an example, the ends of the rod are melted without melting the whole rod.

Once joined, the extruded rod forms a semi-finished ring. The semi-finished ring may be annealed, as illustrated at 308. In an example, the semi-finished ring is annealed at a temperature greater than the glass transition temperature of the thermoplastic material. The semi-finished ring may be annealed for a period of at least 2 hours. The semi-finished ring may be further machined or processed to form a seal ring.

Figure 4:
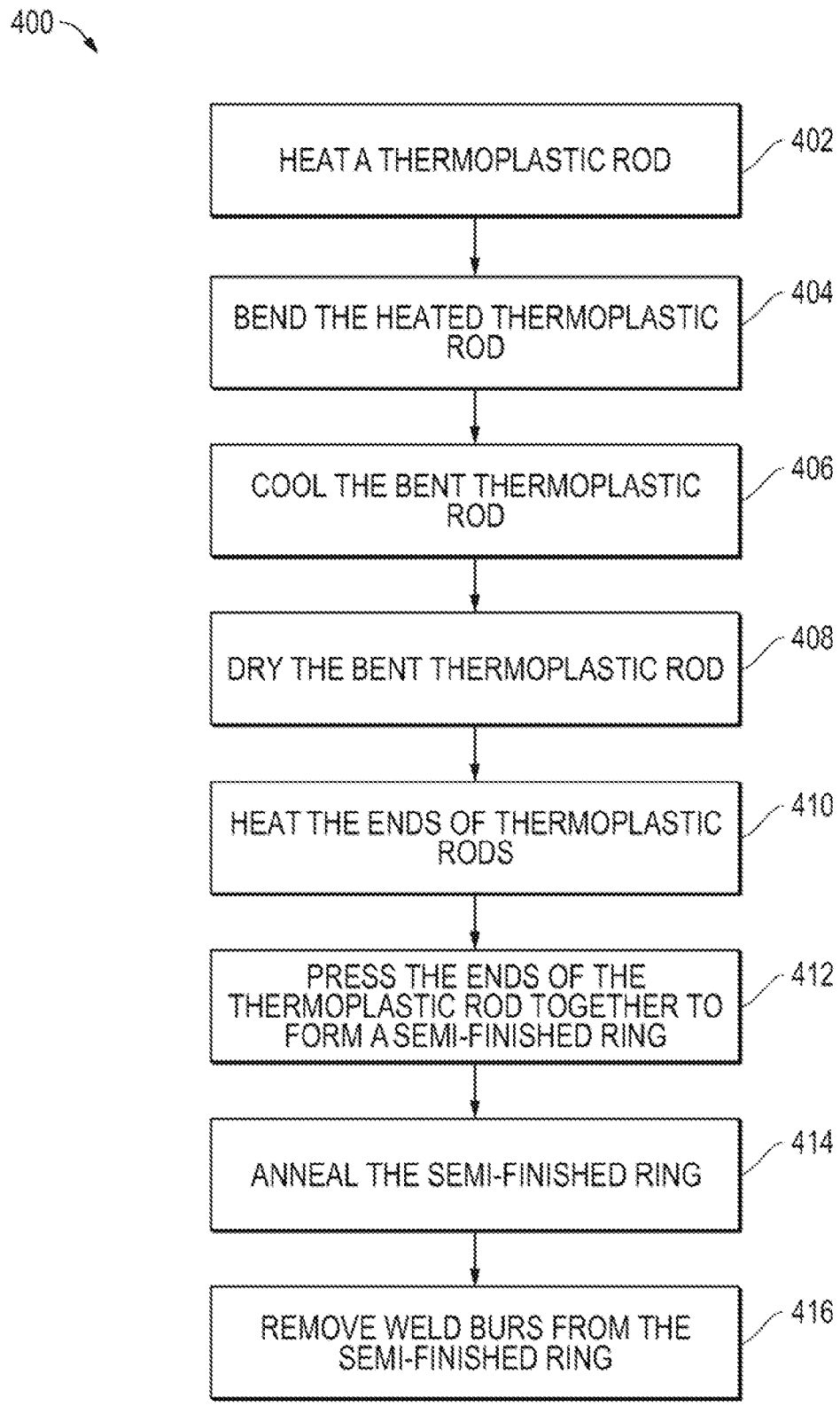

In a further embodiment, FIG. 4 illustrates an exemplary method 400 that includes heating an extruded rod, as illustrated at 402. For example, the extruded rod may include a thermoplastic material, such as PEEK. The rod may be a straight rod. In an example, the PEEK may have a melting point of approximately 343° C. The extruded rod may be heated to a temperature in a range of 200° C. to 342° C. In a particular example, the extruded rod is heated in a hot air oven.

Once heated, the extruded rod may be bent, as illustrated at 404. For example, while the thermoplastic rod is at a temperature greater than the glass transition temperature, preferably with a heat index in the range of 0.6 to 0.999, the rod is bent. In a particular example, the rod may be inserted into a forming machine, such as the machine illustrated in FIG. 5, and bent into the desired shape.

For example, FIG. 5 includes an illustration of an exemplary forming machine 500. The forming machine 500 includes a circular mold 502 that pivots about an axis 503. Around the circumference of the circular mold 502 is a groove 504 for engaging an article 506. In particular, the article 506 may be clamped into the groove by clamp 508. In addition, the forming machine 500 may include a set of rollers 510 distributed around the circumference of the circular mold 502. An axis of a roller 510 may be attached to trucks that traverse tracks 512 or guide rods. Accordingly, the rollers 510 may engage the circular mold 502 or may be disengaged and moved away from the circular mold 502.

In use, the clamp 508 secures an article 506 to the circular mold 502. The circular mold 502 rotates and the clamp 508 rotates with the circular mold 502, drawing the article 506 around the circumference of the circular mold 502 and into the groove 504. As the clamp 508 moves past a roller 510, the roller 510 is engaged with the article 506 and the circular mold 502, applying radial force on the article 506. Accordingly, the article 506 is formed into an arc structure that may be used to form a seal ring. In a further example, the circular mold 502 may be heated to conductively heat the article 506. In another example, bending may be performed in a heated environment, such as an oven.

Returning to FIG. 4, the bent extruded rod is permitted to cool, as illustrated at 406. For example, the bent extruded rod may be cooled to a temperature below a glass transition temperature. In particular, the bent extruded rod may be allowed to cool to a temperature near room temperature. In an example, the bent rod is cooled with forced convection. Subsequently, the bent rod may be removed from the mold.

In an example, the thickness of the cross section of the extruded rod, which becomes the radial thickness once bent, may be less than 1/5 or 20% of the outside diameter of a circle defined by the arc of bent extruded rod. For example, the outside diameter of the circle including an arc defined by the bent rod may be at least 5 times the radial thickness of the rod, such as at least 10 times the radial thickness, or even at least 20 times the radial thickness. In a particular embodiment, the radial thickness is at least 1 inch, such as at least 2 inches.

The cross-section of the extruded rod may be in the shape of a circle or in the shape of a polygon. In particular, the polygon may have at least three sides, such as at least four sides. In an example, the polygon is four-sided in cross-section, such as a rectangle or square. In a particular example, the cross-sectional area of the rod is at least 1 sq. in., such as at least 2 sq. in., or even at least 3 sq. in. Further, the cross-sectional area may be not greater than 50 sq. in.

In preparation for joining the ends of the rod, the rod may optionally be dried, as illustrated at 408. For example, the rod may be heated to a temperature in excess of 100° C. In a particular example, the rod may be heated to a temperature of at least about 110° C., such as at least 130° C., or even at least about 145° C. for a period of at least one hour, such as at least two hours, or even three hours or more. Alternatively, the rod may be removed from the mold in a hot state, but below its glass transition temperature. While the rod is in the hot state, the ends may be joined, such as through the melt welding process described below, which serves to maintain the rod in a dry condition without an additional drying step.

Once dry, the ends of the extruded rod may be joined, such as through melt welding. In an example, the ends of the rod are melted, as illustrated at 410, and pressed together, as illustrated at 412, to form a semi-finished ring. In an example, the ends are melted using a heat source. For example, the heat source may be a contact heat source in which both of the ends contact the heat source and are melted via conduction. In an example, the contact heat source is a flat heated plate. In another example, the heat source may be a non-contact heat source, such as a radiant heat source or convective heat source. Alternatively, the ends may be joined using techniques, such as radiofrequency techniques including microwave techniques, inductive techniques, laser techniques, or any combination thereof.

Figure 6:
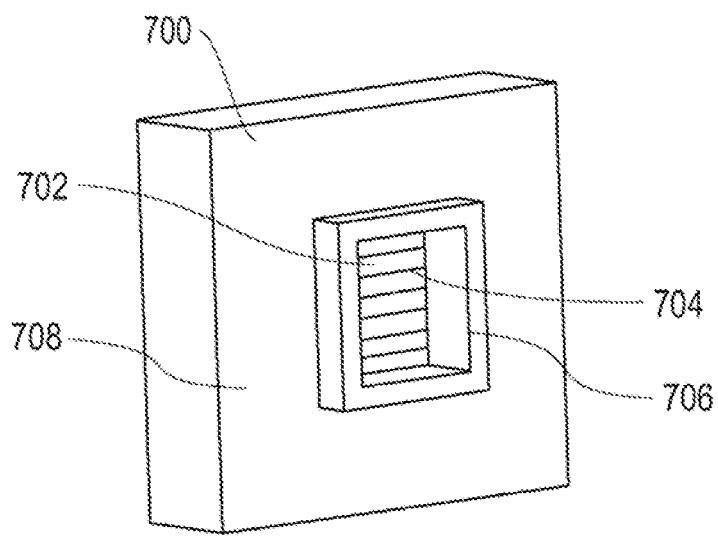
FIG. 6 includes an illustration of an exemplary heater.
Figure 10:
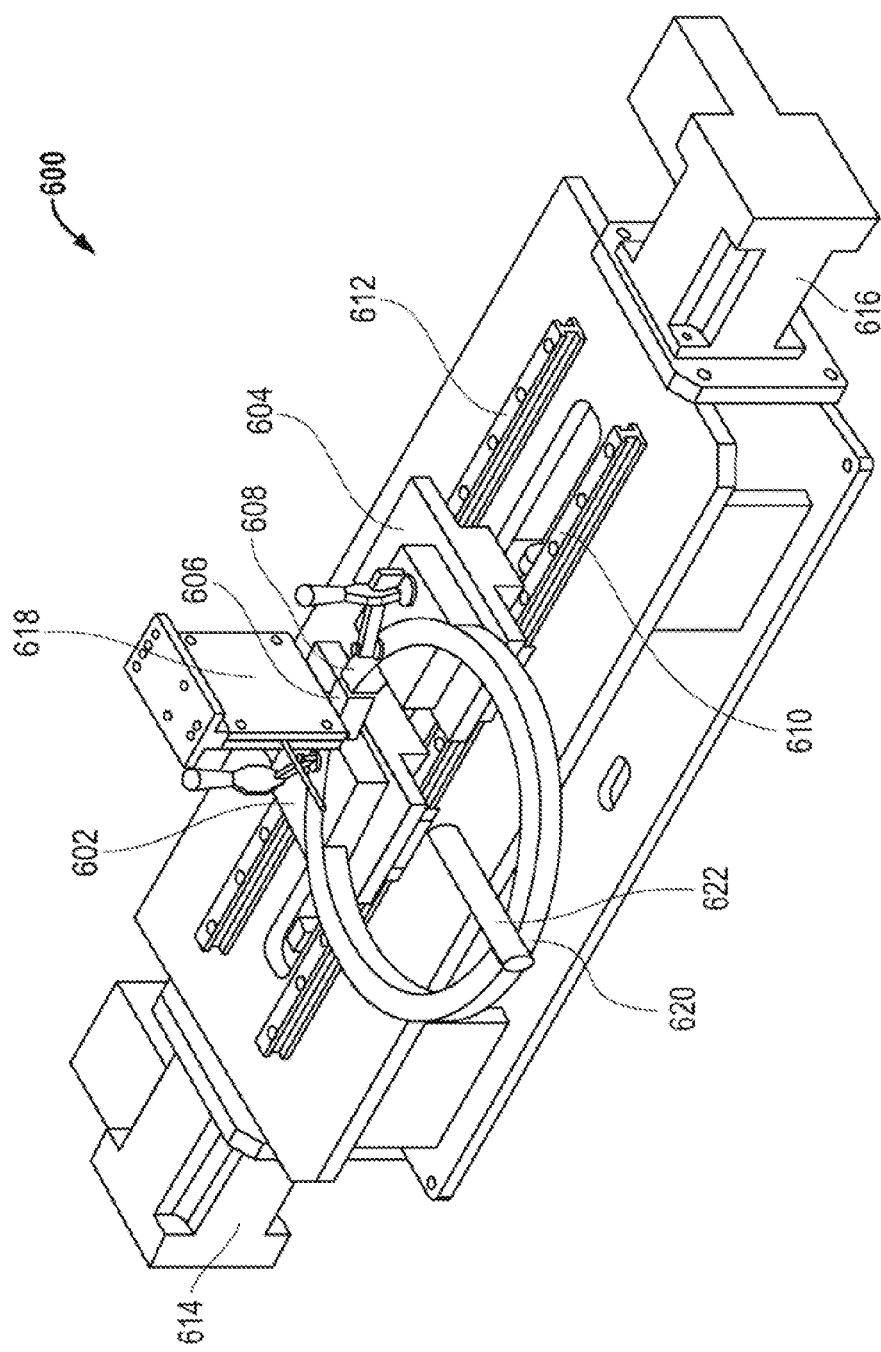
FIG. 10 includes an illustration of an exemplary welding device.

FIG. 10 and FIG. 6 include illustrations of an exemplary heat welding apparatus. For example, as illustrated in FIG. 10, the heat welding apparatus 600 may include a pair of fixtures 602 and 604 for securing respective ends 606 and 608 of a bent thermoplastic rod. The fixtures 602 and 604 may be guided in a path along rails 610 and 612 to motivate the ends 606 and 608 towards one another. The fixtures 602 and 604 may be motivated along rails 610 and 612 by drive mechanisms 614 and 616. In an example, the drive mechanisms 614 and 616 may be servo motors with load cells to control the force supplied to the ends 606 and 608. Alternatively, the drive mechanisms 614 and 616 may include hydraulic, electromechanical, inductive, pneumatic, or other motivating devices. In addition, the welding apparatus 600 may include an arm 622 that extends to an outer diameter of the ring at a location 620. The arm 622 may constrain the outer diameter of the ring, for example, to form a circular shape in contrast to an ovular or egg shape. For example, the arm 622 may apply a radial force to the ring, such as a force directed toward a radial center of the ring. Alternatively, more than one arm may be used to constrain the diameter of the ring to form a desired shape, such as a circular ring, an ovular ring, or an egg-shaped ring.

The heat welding apparatus 600 may also include a heater 618. In use, the heater 618 may be moved into the path of the ends 606 and 608. In the case of a contact heater, the ends 606 and 608 may be motivated to contact either side of the heater 618 to melt the ends 606 and 608. In another example, the heater 618 may be a non-contact heater. An exemplary non-contact heater is illustrated in FIG. 6. For example, the non-contact heater 700 may include a heat source 702, such as a radiant heat source or a convective heat source. In an embodiment, the heat source 702 is separated from the ends 606 and 608 by a plate 708. The ends are placed in proximity to the plate 708 and heated to form a melted area with a flat interface between the melted and unmelted portions of the ends 606 and 608. In an example, the plate 708 does not include an opening or cavity. In the illustrated embodiment, the non-contact heater 700 may optionally include a cavity or opening 704. Optionally, the heater 700 may include a lip 706 surrounding the cavity or opening 704. A similar cavity or opening to that of the cavity or opening 704 may be located on an opposite side of the heater 700. Alternatively, more than one heat source with a cavity or opening may be used to melt the ends 606 and 608.

In use, the ends 606 and 608 may be placed in proximity to the plate 708 or if present, optionally inserted into a cavity or opening 704 of the heater 700. The ends 606 and 608 do not contact the heat source 702. For example, the ends 606 and 608 may be disposed at a position less than 5 mm from the heat source 702, such as not greater than 2 mm, or even not greater than 1 mm from the heat source 702. Once melted, the ends 606 and 608 are withdrawn from the cavity or opening 704, if present. The heater 618 is removed from the path of the rods 606 and 608, and the rods 606 and 608 are pressed together by fixtures 602 and 604 motivated by drive mechanisms 614 and 616. Arms may be used to constrain the outer diameter of the ring during the welding process.

Returning to FIG. 4, the ends of the extruded rod may be pressed together at a pressure of at least 50 psi. For example, the pressure may be at least 75 psi, such as at least 100 psi. In a particular embodiment, the use of a non-contact heat source and desirable pressures results in an essentially void free weld having desirable strength and durability. For example, the ends may be pressed together with enough force to extrude a portion of the material from between the ends of the rod. In an example, a sufficient portion of both ends of the rod are melted and the ends of the rod are pressed together with enough force to extrude material equivalent to at least 1/8" of the rod for each 1 sq. inch of rod cross-section. For example, the ends may be pressed together to extrude at least 1/4" of the rod for each 1 sq. inch of rod cross-section, such as at least 1/2" of the rod per 1 sq. inch of rod cross-section. Maintaining a higher pressure in the melt than the surrounding environment during welding may reduce voids. Other methods to maintain a higher pressure include lowering the surrounding pressure by welding in a vacuum environment or constraining the ability of the molten material to extrude from between the melted ends as they are pushed together. In particular, such methods provide a void-free weld, defined as a weld free of voids having a longest dimension greater than 0.4 mm.

Once welded, the semi-finished ring may be annealed, as illustrated at 414. For example, the semi-finished ring may be annealed at a temperature greater than the glass transition temperature of the extruded thermoplastic material for a period of at least two hours, such as at least four hours, or even at least six hours. In a particular example, the semi-finished ring may be dried, for example, at a temperature greater than 100° C., such as a temperature greater than 120° C., for a period of at least one hour, such as at least two hours. The temperature may be ramped to the annealing temperature at a rate in a range of 5° C. per hour to 15° C. per hour, such as 8° C. per hour to 12° C. per hour. In particular, the annealing temperature may be at least 1.2 times the glass transition temperature, such as at least 1.5 times, or even at least 1.7 times the glass transition temperature, providing the melting point is not exceeded. Once the annealing temperature is reached, the temperature may be maintained for a period of at least two hours, such as at least four hours, at least six hours, or even eight hours or more. The ring may then be cooled at a controlled rate, such as a rate in a range of 5° C. per hour to 15° C. per hour, such as a range of 8° C. per hour to 12° C. per hour, to a temperature of less than the glass transition temperature. The semi-finished ring may then be allowed to cool to room temperature. In an example, the ring is left in the oven while the oven is off until room temperature is reached.

As illustrated at 416, burs or melt flow may be trimmed from the outer surface following annealing. For example, the burs or melt flow from the welds may be abraded or cut from the semi-finished ring. Alternatively, the burs or melt flow may be abraded or cut prior to annealing. Further, the semi-finished ring may be machined to form a seal ring.

Figure 7:
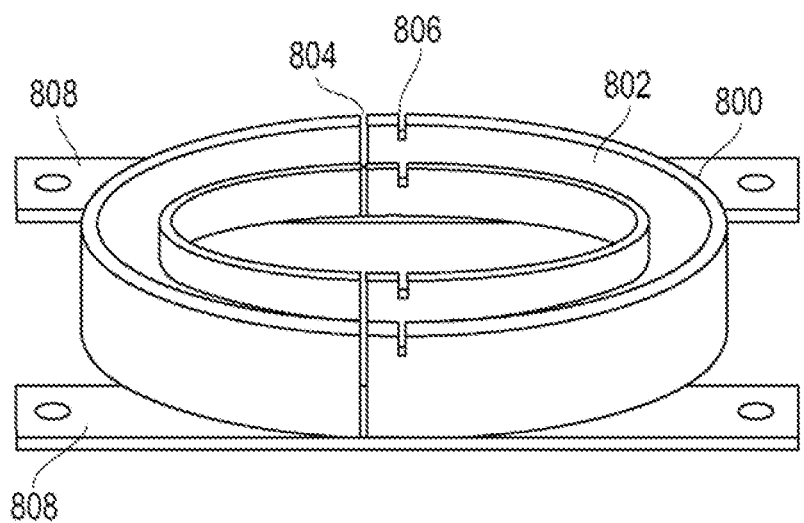
FIG. 7 includes an illustration of an exemplary stencil for cutting.

In addition, the method of FIG. 4 may include trimming the ends of the rod prior to joining the ends. For example, the bent rod may be cut to a uniform arc and the arc used with other arcs to form the seal ring. FIG. 7 includes an illustration of an exemplary template 800 for cutting rods. In an example, the template 800 includes a fixture 802 for securing the rod. The fixture 802 may be secured by mounts 808. Further, the template 800 may include a cut groove 804 along which a cut may be made. Optionally, the template 800 may include a distance groove 806 or guide on which a cutting mechanism may be secured to ensure a straight cut through the cut groove 804. In use, a bent rod may be placed into fixture 802. A cutting mechanism, such as a saw or rotating abrasive wheel, may be guided through the cut groove 804 to form uniform arcs and uniform ends to the arcs.

As a result, seal rings with desirable properties may be formed of engineered thermoplastics. In particular, seal rings formed through such methods may have desirable mechanical properties in addition to being of large circumference and diameter. For example, the above method is particularly useful in forming seal rings having a circumference of at least 0.62 meters, such as at least 1.0 meters, at least 1.5 meters, at least 2.0 meters, at least 4.1 meters, at least 4.5 meters, or even at least 4.8 meters. In a particular embodiment, the method may be used to form a seal ring having a diameter of at least 0.2 meters from a thermoplastic material. For example, the seal ring may have a diameter of at least 0.47 meters, such as at least 1.0 meters, at least 1.3 meters, at least 1.45 meters, or even at least 1.55 meters. In addition or in an alternative embodiment, the seal ring may have a diameter of not greater than 3.0 meters.

The seal ring may be formed of an engineered thermoplastic material that has desirable properties. For example, the thermoplastic rod may be formed of a thermoplastic material, such as an engineering or high performance thermoplastic polymer. For example, the thermoplastic material may include a polymer, such as a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, a liquid crystal polymer, or any combination thereof. In an example, the thermoplastic material includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the thermoplastic material includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the thermoplastic material includes polyketone, such as polyether ether ketone (PEEK), polyether ketone, polyether ketone ketone, polyether ketone ether ketone ketone, a derivative thereof, or a combination thereof. An example thermoplastic fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof. An exemplary liquid crystal polymer includes aromatic polyester polymers, such as those available under tradenames XYDAR® (Amoco), VECTRA® (Hoechst Celanese), SUMIKOSUPER™ or EKONOL™ (Sumitomo Chemical), DuPont HX™ or DuPont ZENITE™ (E.I. DuPont de Nemours), RODRUN™ (Unitika), GRANLAR™ (Grandmont), or any combination thereof. In an additional example, the thermoplastic polymer may be ultra high molecular weight polyethylene. In addition, the seal ring may be formed of a composite material including a thermoplastic material and a filler, such as a fluoropolymer, a solid lubricant, or a combination thereof.

The thermoplastic material may have a melting point of at least 250° C. For example, the melting point may be at least 300° C., such as at least 320° C. In addition, the thermoplastic material may have a desirably high glass transition temperature, such as a glass transition temperature of at least 100° C. For example, the glass transition temperature may be at least 125° C., such as at least 145° C.

In a further example, the seal ring may have a coefficient of friction of not greater than 0.45. For example, the coefficient of friction may be not greater than 0.4, such as not greater than 0.35, or even not greater than 0.3. In particular, the coefficient of friction may be not greater than 0.2, such as not greater than 0.1.

Further, the thermoplastic material may have desirable mechanical properties. For example, the thermoplastic material may have a tensile strength at yield of at least 3,100 psi (21.4 MPa), such as at least 10,000 psi (68.9 MPa), or even at least 15,000 psi (103 MPa). In a further example the thermoplastic material may have a tensile modulus of at least 100 ksi (0.69 GPa), such as at least 750 ksi (5.16 GPa), at least 850 ksi (5.86 GPa), or even at least 1000 ksi (6.89 GPa). Further, the welded thermoplastic material may have a desirable weld elongation-at-break. For example, the weld elongation-at-break may be at least 5%, such as at least 7%, at least 10%, at least 15%, at least 20%, or even at least 30%. Weld elongation-at-break is determined through tensile testing of welded samples according to ASTM D638. The welded samples may or may not be annealed.

In an example in which the seal is formed of a composite material including the thermoplastic material and at least a fluoropolymer dispersed within the thermoplastic material, the composite material may have a weld elongation-at-break of at least 3%. For example, the weld elongation-at-break may be at least 5%, such as at least 8%, at least 10%, at least 15%, or even at least 18%. In an example, the weld tensile strength is at least 40 MPa, such as at least 50 MPa, at least 60 MPa, or even at least 70 MPa. In particular, the weld tensile strength of the composite is at least 50% of the weld tensile strength of the unfilled material, such as at least 60%, or even at least 70% of the weld tensile strength of the unfilled material.

Figure 2:
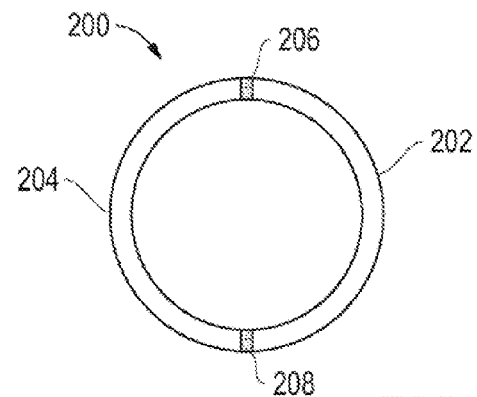

As described in relation to FIG. 1 and FIG. 2, the seal ring may include a weld. Depending upon the size of the ring and the number of joints used to form the ring, the seal ring may include more than one weld, such as two welds, or even three welds or more.

The exemplary weld method can also be used to weld arcs of extruded or compression molded thermoplastics that are cut from a plate to create a semi-finished ring with desirable properties after annealing. While welding is used herein to specifically denote a method of heating ends of rods and pressing the ends together, other joining techniques may be used to join the ends of rods. For example, other joining techniques may include injection-molding to join ends, ultrasonic treating, induction heating, or an irradiative techniques, such as a laser or a microwave technique. The adjoined ends formed through welding are referred to herein as a weld and the adjoined ends formed through welding or another joining technique is referred to herein as a joint.

In addition, the welding or joining of arcs or portions can be used to form circular, ovular, polygonal or complex shaped seals. For example, the seal can have a polygonal shape, such as a triangle, square, rectangle, pentagon, hexagon, heptagon, octagon, or any combination thereof. The polygon may have at least four sides, such as at least 6 sides, at least 8 sides, or even at least 10 sides. In another example, a complex shape can be a FIG. 8, irregular polygons, or other complex shapes. In particular, the shapes may be closed. Alternatively, the shapes may be open, having one or more breaks along their extent.

Particular embodiments of the above-described method provide technical advantages over conventional techniques. While reducing waste, such present embodiments also enable the production of large size seal rings of thermoplastic material having desirable mechanical properties. In particular, the present embodiments provide for seal rings having a circumference of at least 1.5 meters or a largest diameter of greater than 1.3 meters with desirable elongation-at-break properties. Such properties are indicative of durability and suitability as a seal ring. Moreover, such methods provide for seal rings formed of engineering thermoplastic materials that typically have greater glass transition temperatures and melt temperatures and characteristically have high modulus and high tensile strength. In addition, such thermoplastic engineering thermoplastic materials have desirable coefficients of friction.

In particular, the above methods permit the formation of large circumference seal rings from extruded rods of desirable materials. Conventional techniques for forming seal rings are limited in diameter or limited in material of use. Conventional techniques based on cutting seal rings from extruded sheets suffer from limits to seal diameter and suffer from variability between properties in the machine and transverse directions being transferred to the seal ring. Typically it is difficult to extrude suitable thermoplastics in sheets greater than 1 meter. Conventional compression molding techniques are limited in the material of use and provide poor mechanical properties. In contrast, the present methods provide a ring that can be used with a variety of materials, provides for a seal ring whose properties in the circumferential direction are related to machine direction properties of the extruded rod, and has desirable durability and mechanical properties.

Further, particular embodiments of fluoropolymer filled composite material are adapted for use in the above methods. For example, particular fluoropolymer filler permits welding of the seal ring to produce a desirable weld elongation-at-break, whereas other filled composites provide for less desirable weld elongation-at-break.

EXAMPLES

Example 1

Four PEEK rods are heated to different temperatures (150° C., 200° C., 285° C., and 310° C.) and are formed around a steel wheel. The formability of the heated PEEK rods is measured as the distance between the two ends of the 34 inch rod while it is tightly wound around the 15.5 inch diameter steel wheel. Table 1 illustrates the formability.

TABLE 1

Formability of Thermoplastic Rods

| Temperature (° C.) | Formability (in) |
|---|---|
| 150 | NF |
| 200 | 17.0 |
| 285 | 16.7 |
| 310 | 16.5 |

NF—Not Formable

The rod that is heated to 150° C. is too rigid to form. With increasing temperature, flexibility of the PEEK rod increased. Around 310° C., the PEEK rod has relatively high formability.

Example 2

Three PEEK rods are heated to 310° C. and are formed around a steel wheel. The arcs are removed from the wheel when the core temperatures reached a specified temperature. The relaxation of the cooled PEEK arc is measured to determine spring-back. As illustrated in Table 2, PEEK rods spring-back significantly when removed from the wheel at temperatures above the glass transition temperature of PEEK. When removed below the glass transition temperature, the PEEK arcs show similar and relatively low spring-back.

TABLE 2

Spring-back of Thermoplastic Rods

| Temperature (° C.) | Spring-Back (in) |
|---|---|
| 200 | 3 |
| 125 | 0.25 |
| 22 | 0.25 |

Example 3

Fourteen 4"×1"×1" extruded PEEK bars available from McMaster-Carr are used to prepare seven welded bars by contact hot plate welding. One sample is formed after drying at 90° C. for 3 hours before welding. The remaining samples are formed from rods that are dried at temperatures in the range of 135° C. to 190° C. for 2 hours.

The samples are prepared by heating rod ends with a heater temperature in the range of 385° C. to 450° C. and contacting the rods ends together at a pressure of 100 psi. The samples are machined for tensile testing. In addition, some of the samples are annealed at temperatures of 250° C. for a period of 4 hours. The samples are compared to an extruded sample available from McMaster-Carr and an extruded control available from Ensinger. Table 3 illustrates the elongation-at-break properties for the samples.

TABLE 3

Elongation-at-break for Welded Samples

| Sample (weld temp., weld time) | Avg. Elongation-at-break (%) |
|---|---|
| Extruded | 28 |
| Unannealed Extruded | 22 |
| Annealed Extruded | 23 |
| Unannealed 420° C., 40 s | 9 |
| Annealed 420° C., 20 s | 13 |
| Unannealed 445° C., 40 s | 7 |
| Annealed 445° C., 40 s | 12 |
| Annealed 385° C., 20 s | 3 |
| Annealed 450° C., 20 s | 9 |

The extruded PEEK from McMaster-Carr exhibits poor elongation-at-break when compared with extruded PEEK available from Ensinger. Welded PEEK samples generally exhibit lower elongation-at-break compared to unwelded references. Annealed samples exhibit improved elongation-at-break over unannealed samples.

When elongation-at-break values are evaluated as a function of hot plate temperature and heat time during welding, both hot plate temperature and heat time influence mechanical performance. Table 4 illustrates the elongation-at-break properties. Comparing the samples at a hot plate temperature of 385° C. and heat times of 20 s, 40 s, and 60 s, the heating time of 40 s provided an elongation-at-break of 13% for the annealed sample. Heating at 60 s provided similar results.

TABLE 4

Elongation-at-break (%) for Samples

| | Contact Time (s) | | |
|---|---|---|---|
| Temp. (° C.) | 20 s | 40 s | 60 s |
| 445 | 9 | 11 | |
| 420 | 13 | | |
| 385 | 3 | 13 | 12 |

As a function of temperature, the 420° C. sample exhibits desirable elongation-at-break, even for samples with short heat times. At 20 s, the hot plate temperature of 420° C. provides higher elongation-at-break values than a hot plate temperature of 385° C. and 445° C. Accordingly, 385° C. appears to be too low to affect adequate bonding and 445° C. appears to be too hot, potentially degrading the material.

Example 4

Samples are formed from extruded PEEK available from Ensinger. Welding is performed using hot plate contact welding and hot plate non-contact welding. The extruded PEEK bars are dried at 150° C. for two and a half hours.

Welding is performed with a hot plate at a temperature in the range of 400° C. and 420° C. Contact welding includes contacting rod ends with the hot plate for a period in the range of 40 s to 60 s. Non-contact welding is carried out with the hot plate at 500° C. with a dwell time of 240 s. During heating, the non-contact rod ends are held 1 mm to 2 mm from the plate. Once melted, the ends are pressed together to form the samples.

The hot plate contact samples are annealed at a temperature around 250° C. for a period between 4 hours and 8 hours. Table 5 illustrates the elongation-at-break.

TABLE 5

Affect of Annealing on Mechanical Properties

| Annealing | Avg. Elongation-at-break (%) |
|---|---|
| Non-contact Control | 12 |
| Control | 18 |
| 250° C., 4 hours | 13 |
| 250° C., 8 hours | 33 |
| 300° C., 4 hours | 19 |

Based on the illustrated elongation-at-break, annealing at 250° C. for a period of 8 hours appears to provide desirable elongation-at-break properties. Other annealing periods and temperatures provided lower elongation-at-break values.

Example 5

Extruded PEEK samples are welded. The samples are dried at a temperature of 150° C. for three hours. Welding is performed at plate temperatures of 420° C. for a period of 40 s. The ends are pressed together at a pressure of 100 psi. All welds are annealed at 250° C. for a period of 8 hours. The samples are machined for tensile testing. Table 6 illustrates the average elongation-at-break and distribution of results.

TABLE 6

Mechanical Properties of Welded PEEK

| | 420° C., 40 s | 420° C., 60 s |
|---|---|---|
| Avg. Elongation (%) | 37.19 | 37.05 |
| % Samples >20% Elongation | 35 | 43 |

Example 6

In accordance with the above examples, samples are formed from dried extruded PEEK available from one of Ensinger or Quadrant. The sample ends are heated at 420° C. for at least 40 s and pressed together for a period of at least 40 s. The samples are annealed at a temperature of 250° C. for a period of 8 hours. The samples are machined for mechanical property testing. Table 7 illustrates the elongation-at-break for the samples in a procedure that conforms to ASTM D638.

TABLE 7

Elongation-at-break for Welded PEEK Materials

| | Mean Elongation-at-break (%) | | |
|---|---|---|---|
| | Control | Contact | Non-Contact |
| Ensinger | 14.24 | 18.77 | 22.46 |
| Quadrant | 19.35 | 33.88 | 38.44 |

Example 7

During the experiments performed in relation to the other examples, Applicants noted that early failure tended to be attributable to voids near the welded surfaces. Samples are made in a manner similar to that of Example 5. The melted ends of the rods are pressed together at a pressure of at least 50 psi. Material in an amount equivalent to at least 1/8" of the rod length per square inch of cross-section extrudes from between the rods when they are pressed together. CT scans illustrate that the extruded material removes the voids, leaving a low void bond. Other methods to maintain a higher pressure within the melt than the surrounding pressure include lowering the surrounding pressure by welding in a vacuum environment or constraining the ability of the molten material to extrude from between the melted ends as they are pushed together.

Example 8

A grade of extruded PEEK with excellent properties for a seal comprises 15% PTFE. It has the following properties as an extruded rod.

TABLE 8

Properties of PTFE-filled PEEK Extruded Rod

| Property | ASTM No. | US Value | SI Unit |
|---|---|---|---|
| General | | | |
| Form | — | Pellets (Gray) | Pellets (Gray) |
| Composition (Polyetherketoneketone) | — | PTFE filled | PTFE filled |
| Filler Content (Nominal value) | — | 15% | 15% |
| Specific Gravity | D792 | 1.39 | 1.39 g/ml |
| Linear Mold Shrinkage, in/in | D955 | 0.01 | 0.01 cm/cm |
| Moisture Absorption @24 hr., % | D570 | 0.1 | 0.10% |
| Mechanical | | | |
| Tensile Strength (Break), ksi | D638 | 12 | 83 MPa |
| Tensile Modulus, Mpsi | D638 | 0.5 | 3.4 GPa |
| Elongation (Break), % | D638 | 15 | 15% |
| Flexural Strength (Yield) ksi | D790 | 21 | 144 MPa |
| Flexural Modulus Mpsi | D790 | 0.5 | 3.4 GPa |
| Izod, Notched, ft-lb/in @1/8" | D256 | 0.8 | 0.6 J/cm |
| Hardness, Shore D | D2240 | 85 | 85 |
| Thermal | | | |
| Melting Point, ° F. | DSC | 650 | 343° C. |
| Tg (Glass Transition), ° F. | DSC | 290 | 143° C. |
| Flammability Rating (UL 94) | UL94 | V-0 | V-0 |
| HDT@264 psi, ° F. | D648 | 340 | 171° C. |
| Other | | | |
| Kinetic Coefficients of Friction | D1894 | 0.1 | 0.1 |
| Static Coefficients of Friction | D1894 | 0.1 | 0.1 |

An extruded rod of 25% PTFE-filled PEEK composite also has an acceptable elongation-at-break of 10% and a low coefficient of friction.

A third composite contains 10% carbon black-filled PEEK. It has a desirable elongation-at-break while providing the PEEK with static dissipative properties.

Example 9

Extruded PEEK samples are welded. As indicated, a subset of the samples is dried at a temperature of 150° C. for three hours. Welding is performed at plate temperatures of 420° C. for a period of between 40 s and 60 s. The ends are pressed together. As indicated, a subset of the samples is annealed at 250° C. for a period of 8 hours. The samples are machined for tensile testing.

Samples are tested using Computed Tomography (CT) scanning and ultrasonic scanning. The CT scanning is performed with the parameters 150 kV, 50 mA, 30 micrometer Voxel, 800 images, and 1 sec time. Ultrasonic scanning is performed by ultrasonic NDT with a transducer frequency of 50 MHz.

A comparison of void detection by the scanning techniques is illustrated in Table 9. As illustrated, CT detects voids near the surface and voids having a size less than 0.38 mm. Ultrasonic scanning is less effective at detecting voids near the surface or having a size less than 0.38 mm. Typically, seals are machined, removing voids near the surface and a limited number of voids of size less than 0.4 mm have little influence on performance, such as elongation and tensile strength.

TABLE 9

Void Detection Using Scanning Techniques

| Reference | Void Size, mm (if any) | Ultrasonic NDT | CT Results |
| --- | --- | --- | --- |
| No Pre-drying, Normal Anneal | 0.38, Surface | No Voids | Voids |
| No Pre-drying, Normal Anneal | — | No Voids | No Voids |
| Pre-dried, Normal Anneal | Large Voids | Voids | Voids |
| Pre-dried, Normal Anneal | Large Voids, Surface | Voids | Voids |
| No Pre-Drying, Not Annealed | 0.7 mm, Surface | No Voids | Voids |
| Pre-dried, Not Annealed | — | No Voids | No Voids |

Samples similar to the above samples are tested for elongation and tensile properties. As illustrated in Table 10, the average sample absent voids exhibits a large elongation, whereas samples having voids detectable by Ultrasonic NDT failed at the weld and exhibit no or little elongation.

TABLE 10

Elongation Properties for Samples

| Sample | Elongation (%) |
| --- | --- |
| Average (Weld 420° C., 40 s) | 37.19 |
| Average (Weld 420° C., 60 s) | 37.05 |
| Surface Porosity (Weld 420° C., 60 s) | 7.22 |
| Surface Porosity (Weld 420° C., 40 s) | 5.34 |
| Subsurface Porosity (Weld 420° C., 60 s) | 2.57 |

As illustrated in Table 10, the average elongation for the samples is significantly greater than 20%. When voids are present, either at the surface or under the surface, the elongation drops significantly.

In an example, a method of testing voids includes determining settings of an ultrasonic scanning device based on comparative testing relative to another scanning technique, such as CT scanning. For example, a set of samples including a variety of void conditions or types can be scanned using a CT technique and an ultrasonic technique. The samples can be tested for a property, such as a mechanical property, for example, tensile strength or elongation, to determine what constitutes a significant defect or a defect having an influence on the property. Desirable parameters for the ultrasonic scanning technique can be determined that result in detection of the significant defect, while having limited success for detecting insignificant defects.

In a particular embodiment, a method of forming a seal ring includes heating a thermoplastic rod to a temperature above a glass transition temperature. The thermoplastic rod has first and second ends. The method further includes bending the thermoplastic rod into a circular structure while the temperature is above the glass transition temperature, joining the first and second ends of the thermoplastic rod to form a semi-finished ring, and annealing the semi-finished ring.

In an embodiment, a method of forming a seal ring includes heating an extruded rod to a temperature above a glass transition temperature. The extruded rod has first and second ends. The method further includes bending the extruded rod into a circular structure while the temperature is above the glass transition temperature, joining the first and second ends of the extruded rod to form a semi-finished ring, and annealing the semi-finished ring.

In another exemplary embodiment, a method of forming a seal ring includes heating an extruded rod to a temperature above a glass transition temperature of a material of the extruded rod. The extruded rod has first and second ends. The method further includes bending the extruded rod while the temperature is above the glass transition temperature, cooling the bent extrude rod to a temperature below the glass transition temperature, melt welding the first and second ends of the extruded rod to form a semi-finished ring, and annealing the semi-finished ring.

In a further exemplary embodiment, a method of forming a seal ring includes heating first and second extruded rods to a temperature above a glass transition temperature and below a melting point of a material of the extruded rods. The extruded rods have first and second ends. The method further includes bending the extruded rods while the temperature is above the glass transition temperature, joining the first ends of the first and second extruded rods and the second ends of the first and second extruded rods to form a semi-finished ring, and annealing the semi-finished ring.

In a further exemplary embodiment, a method of forming a seal ring includes cutting arcs from a compression molded or extruded sheet. The arcs have first and second ends. The method further includes joining the first ends of the first and second arcs and the second ends of the first and second arcs to form a semi-finished ring, and annealing the semi-finished ring.

In an additional embodiment, an apparatus includes a circular mold comprising a groove disposed around the circumference of the circular mold. The circular mold is to pivot around a central point. The apparatus also includes a clamp to secure an article in the groove of the circular mold. The clamp is configured to follow the pivoting motion of the circular mold. The apparatus further includes a plurality of rollers distributed around the circumference of the circular mold. Each roller of the plurality of rollers is configured to engage and apply radial force to the article after the clamp passes the position of the each roller.

In another exemplary embodiment, a seal ring includes a thermoplastic material having a weld elongation-at-break of at least 5%. The seal ring has a diameter of at least 1.3 meters.

In a further exemplary embodiment, a seal ring has a weld and includes a thermoplastic material having a glass transition temperature of at least 100° C. The thermoplastic material has a weld elongation-at-break of at least 5%. The seal ring has a diameter of at least 1.3 meters. The seal ring has a coefficient of friction of not greater than 0.45.

In an additional embodiment, a seal ring includes extruded PEEK material having a weld elongation-at-break of at least 5%. The seal ring has a diameter of at least 1.3 meters.

In a further embodiment, an apparatus includes a first fixture to engage a first end of a thermoplastic arc member and a second fixture to engage a second end of the thermoplastic arc member. The first and second fixtures motivate the first and second ends along a path in relative motion toward one another. The apparatus also includes a heater including a heat source. The heater is configured to move into the path. The first and second fixtures move the first and second ends into proximity to the heat source without contacting the heat source. The first and second ends at least partially melt. The first and second fixtures are to motivate the first and second at least partially melted ends into contact with each other.

In a first embodiment, a seal ring includes a weld and a thermoplastic material a weld elongation-at-break of at least 3%. In an example of the first embodiment, the seal ring has a circumference of at least 0.62 meters, such as a circumference of at least 1.5 meters. In another example, the seal ring has a diameter of at least 0.2 meters, such as 1.3 meters.

In a further example, the thermoplastic material is selected from the group consisting of a polyketone, polyaramid, polyimide, polyetherimide, polyamideimide, polyphenylene sulfide, polysulfone, thermoplastic fluoropolymer, a derivation thereof, and a combination thereof. For example, the thermoplastic material may be selected from the group consisting of a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In another example, the thermoplastic material is a polyketone material selected from the group consisting of polyether ether ketone, polyether ketone, poly ether ketone ketone, a derivation thereof, and a combination thereof. In an additional example, the thermoplastic material comprises ultra high molecular weight polyethylene.

In a particular example, the seal ring has a coefficient of friction of not greater than 0.45, such as not greater than 0.35. The thermoplastic material may have a melting point of at least 250° C., such as at least 300° C., or even at least 320° C. The thermoplastic material may have a glass transition temperature of at least 100° C., such as at least 125° C., or even at least 145° C.

In an additional example of the first embodiment, the thermoplastic material has a tensile strength of at least 3100 psi, such as at least 10000 psi, or even at least 15000 psi. The thermoplastic material may have a tensile modulus of at least 100 ksi, such as at least 750 ksi, or even at least 850 ksi.

In another example of the first embodiment, the weld elongation-at-break is at least 5%, such as at least 10%, at least 15%, or even at least 20%.

In an example of the first embodiment, the seal ring has a radial thickness not greater than 20% of the diameter. Further, the seal ring may have a cross-section in the shape of a polygon, such as a polygon having at least four sides.

In an additional example, the thermoplastic material may include a solid lubricant filler, such as PTFE or carbon black.

In a second embodiment, a seal ring has a weld and comprises a thermoplastic material having a glass transition temperature of at least 100° C. The thermoplastic material with the weld has a weld elongation-at-break of at least 3%. The seal ring has a circumference of at least 0.62 meters. The seal ring has a coefficient of friction of not greater than 0.45. In an example of the second embodiment, the coefficient of friction is not greater than 0.4, such as not greater than 0.35.

In a further example of the second embodiment, the weld elongation-at-break is at least 5%, such as at least 10%, at least 15%, or even at least 20%. The thermoplastic material may have a tensile modulus of at least 100 ksi. In an example, the glass transition temperature is at least 125° C., such as at least 145° C.

In a third embodiment, a seal ring includes extruded PEEK material having a weld elongation-at-break of at least 3%. The seal ring has a circumference of at least 1.5 meters. In an example of the third embodiment, the extruded PEEK material is a composite material comprising a filler. For example, the filler may include a solid lubricant, such as PTFE. In another example, the filler includes a ceramic or mineral. In an additional example, the filler include carbon black.

In a further example of the third embodiment, the weld elongation-at-break is at least 5%, such as at least 10%, at least 15%, or even at least 20%. In addition, the seal ring may further include a weld.

In a fourth embodiment, a seal ring has a joint and includes a composite material including a thermoplastic material and a solid lubricant. The composite material with the joint has a weld elongation-at-break of at least 3%. The seal ring has a coefficient of friction of not greater than 0.45.

In an exemplary embodiment, a method of testing seals includes scanning a set of seals using an ultrasonic technique. The set of seals includes a subset of seals with a defect. The ultrasonic technique has an associated parameter. The method further includes scanning the set of seals using a computed tomography technique, testing each seal of the set of seals for a mechanical property, and determining a value of the associated parameter of the ultrasonic technique to provide for detection of the defect.

In an example, the seals are formed of a polyketone material and wherein the defect comprises a void having a longest dimension not greater than 0.4 mm. In a further example the parameter is frequency. In an additional example, the mechanical property is elongation.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of forming a seal ring, the method comprising:
heating a thermoplastic rod to a temperature above a glass transition temperature, the thermoplastic rod having first and second ends;
bending the thermoplastic rod into a circular structure while the temperature is above the glass transition temperature;
joining the first and second ends of the thermoplastic rod to form a semi-finished ring; and
annealing the semi-finished ring, wherein annealing includes ramping the temperature of the semi-finished ring to a temperature greater than the glass transition temperature at a rate in a range of 5° C. per hour to 15° C. per hour, maintaining the semi-finished ring at the temperature for a period of at least 2 hours, and cooling the semi-finished ring at a controlled rate in a range of 5° C. per hour to 15° C. per hour.

2. The method of claim 1, wherein the thermoplastic rod is an extruded thermoplastic rod.

3. The method of claim 1, wherein the thermoplastic rod is a compression molded thermoplastic rod.

4. The method of claim 1, wherein joining comprises:
heating the first and second ends to a temperature above a melting point of the material of the thermoplastic rod; and
pressing the first and seconds ends together.

5. The method of claim 4, wherein heating the first and second ends includes heating with a non-contact heat source.

6. The method of claim 4, wherein pressing the first and second ends together includes pressing the first and second ends together with a pressure of at least 50 psi.

7. The method of claim 1, wherein heating the rod includes heating to a heating index in a range of 0.6 to 0.999.

8. A method of forming a seal ring, the method comprising:
heating an extruded rod to a temperature above a glass transition temperature, the extruded rod having first and second ends;
bending the extruded rod into a circular structure while the temperature is above the glass transition temperature;
joining the first and second ends of the extruded rod to form a semi-finished ring; and
annealing the semi-finished ring, wherein annealing includes ramping the temperature of the semi-finished ring to a temperature greater than the glass transition temperature, maintaining the semi-finished ring at the temperature for a period of at least 6 hours, and cooling the semi-finished ring at a controlled rate in a range of 5° C. per hour to 15° C. per hour.

9. The method of claim 8, wherein joining comprises:
heating the first and second ends to a temperature above a melting point of the material of the extruded rod; and
pressing the first and seconds ends together.

10. The method of claim 9, wherein heating the first and second ends includes heating with a non-contact heat source.

11. The method of claim 9, wherein pressing the first and second ends together includes pressing the first and second ends together with a pressure of at least 50 psi.

12. The method of claim 9, wherein pressing the first and second ends together includes pressing the first and second ends to extrude material in the amount of at least 1/8" of rod material per square inch of rod cross-section.

13. The method of claim 8, further comprising drying the bent extruded rod prior to joining.

14. The method of claim 8, further comprising cooling the bent extruded rod to a temperature below the glass transition temperature after bending and removing the cooled bent extruded rod from a forming device used to bend the extruded rod.

15. The method of claim 8, wherein bending includes bending to a radius at least 5 times the radial thickness of the extruded rod.

16. A method of forming a seal ring, the method comprising:
heating an extruded rod to a temperature above a glass transition temperature of a material of the extruded rod, the extruded rod having first and second ends;
bending the extruded rod while the temperature is above the glass transition temperature;
cooling the bent extrude rod to a temperature below the glass transition temperature;
melt welding the first and second ends of the extruded rod to form a semi-finished ring; and
annealing the semi-finished ring, wherein annealing includes ramping the temperature of the semi-finished ring to a temperature greater than the glass transition temperature, maintaining the semi-finished ring at the temperature for a period of at least 4 hours, and cooling the semi-finished ring at a controlled rate in a range of 5° C. per hour to 15° C. per hour.

17. The method of claim 16, wherein melt welding comprises:
heating the first and second ends to a temperature above a melting point of the material of the extruded rod with a non-contact heat source; and
pressing the first and seconds ends together.

18. The method of claim 17, wherein pressing the first and second ends together includes pressing the first and second ends together with a pressure of at least 50 psi.

19. The method of claim 16, further comprising cutting the bent extruded rod proximal to the first end prior to melt welding.

* * * * *